United States Patent [19]

Erickson

[11] 4,223,859
[45] Sep. 23, 1980

[54] PAIL AND WORK STAND ASSEMBLY

[76] Inventor: Elwyn J. Erickson, 210 Sixth Ave. NW., Wells, Minn. 56097

[21] Appl. No.: 923,822

[22] Filed: Jul. 12, 1978

[51] Int. Cl.² ............................................. A47G 23/02
[52] U.S. Cl. ............................................................ 248/154
[58] Field of Search ............... 248/146, 154, 310, 313, 248/500, 509

[56] References Cited

U.S. PATENT DOCUMENTS

| | | | |
|---|---|---|---|
| 781,713 | 2/1905 | Cahill | 248/154 |
| 1,396,445 | 11/1921 | Loudon | 248/154 |
| 1,609,246 | 11/1926 | Hamburger | 248/409 X |
| 2,283,324 | 5/1942 | Faber | 248/118.7 X |
| 2,513,461 | 7/1950 | Duncan | 248/154 |
| 3,178,142 | 4/1965 | Koch | 248/146 |
| 3,211,404 | 10/1965 | Edmiston et al. | 248/154 |

Primary Examiner—William H. Schultz
Attorney, Agent, or Firm—Burd, Bartz & Gutenkauf

[57] ABSTRACT

A pail and work stand assembly for supporting a pail at an elevated location to provide a workman access to the contents of the pail. The pail can contain, for example, plaster, mortar, joint compound or other building materials while the workman works on the ceiling of a room using a pair of stilts or a ladder. A column assembly of the stand elevates a pail tray and can be adjustable in length. A plurality of fasteners are connected between the upper edge of the pail and the pail tray to securely hold the pail with respect to the stand whereby the workman can move the pail and stand without having to get off of the stilts or down from the ladder.

10 Claims, 5 Drawing Figures

PAIL AND WORK STAND ASSEMBLY

SUMMARY OF THE INVENTION

Workmen working at an elevation often work on stilts or shoe jacks for purposes of mobility as when plastering a ceiling. The plaster is contained in a pail which sits freely on a stand having an elevated tray. When the workman wants to move the pail, it is difficult to grasp both the pail and the stand at the same time while on the stilts, so generally the workman gets off of the stilts to move the pail and stand. The same is generally true when the workman is working on a ladder, planking or on scaffolding. This consumes time and slows down the work procedure.

The invention pertains to a pail and work stand assembly to elevate a pail and place it in working proximity to a workman working on stilts or other means of elevation. The assembly includes a stand having a pedestal-type base supporting a column assembly which can be comprised of two or more telescoping column members for purposes of height adjustment. A tray support is secured to the top of the column assembly and carries a generally horizontal tray. A pail is supported on the tray for containing building material, such as plaster. A plurality of fasteners or tie down straps secure the pail to the tray such that the pail and tray can be moved in unison. The fasteners can be of a variety extending from a lip on the tray to the upper edge of the pail and having hooks on either end for purposes of engaging the pail and the tray, the hooks being connected by an expandible cord or link normally in tension when securing the pail to the tray. The workman is able to move the pail and stand from one location to another by simply lifting the standard handle provided on the pail. It is unnecessary to dismount from the stilts thus saving him considerable time.

IN THE DRAWINGS

DESCRIPTION OF THE PREFERRED EMBODIMENT

Figure 1:
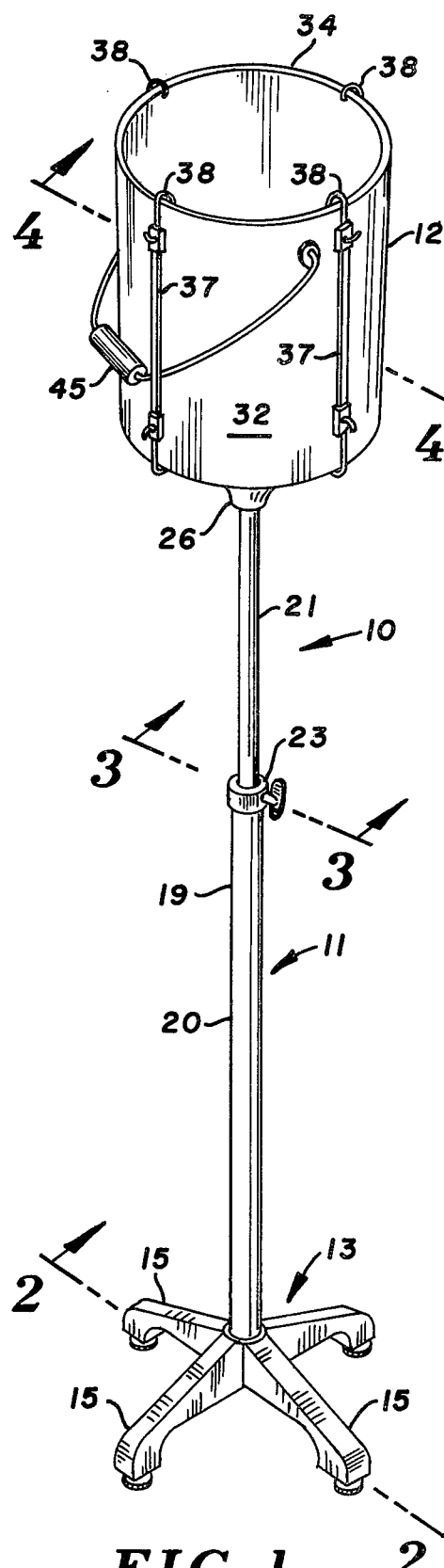
FIG. 1 is a perspective view of the pail and work stand assembly according to the invention.
Figure 2:
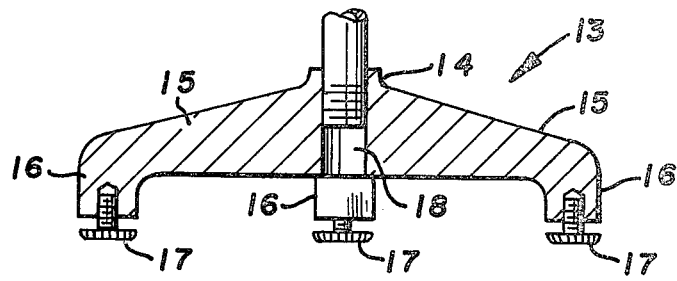
FIG. 2 is an enlarged sectional view of the base of the pail and work stand assembly of FIG. 1 taken along the line 2—2 thereof.

Referring to the drawings, there is shown in FIG. 1 a pail and work stand assembly indicated generally at 10 according to the present invention. Pail and work stand assembly 10 includes a work stand 11 supporting an elevated pail 12 where it can be located in proximity to a workman working at an elevated location as when doing work upon the ceiling of a room. Pail 12 can contain plaster, paint, mortar, or other building material.

Work stand 11 includes a pedestal-type base 13 having a plurality of four symetrically disposed legs 15 centrally connected to an enlarged boss 14. Legs 15 extended generally outwardly from boss 14 and terminate in downwardly extended feet 16. Leveling pads 17 are threaded into suitable openings provided on the lower surface of feet 16 in order to permit leveling of the base 13.

Work stand 11 includes a column assembly 19 having a first or lower column member 20 and a second or upper column member 21. The lower end of first column member 20 is threadably engaged in an opening 18 of boss section 14 to secure it with respect to base 13. First column 20 is a hollow, tubular type member having an open top for telescopic receipt of the lower end of second column member 21. Second column member 21 is movable into and out of the upper end of first column member 20 in order to adjust the height of stand 11. A collar 23 surrounds the upper end of first column member 20 having an opening in alignment with the open top of first column member 20. A thumbscrew 24 is threaded through an opening in collar 23 and can be threaded inward thereof in order to secure the second column member 21 at the selected location with respect to the first column member 20 to fix the desired stand height.

A tray support 26 is fixed to the upper end of second column member 21 as by having the upper end of second column member 21 threadably engaged in the lower portion of tray support 26. Tray support 26 includes a plurality of outwardly extended arms 27 having flat upper surfaces so as to support a generally horizontal, flat pail tray 28. A plurality of flathead screws 30 are screwed through the tray 28 and into the support arms 27 to firmly secure the tray 28 to the support arms 27 of tray support 26.

Figures 3, 5:
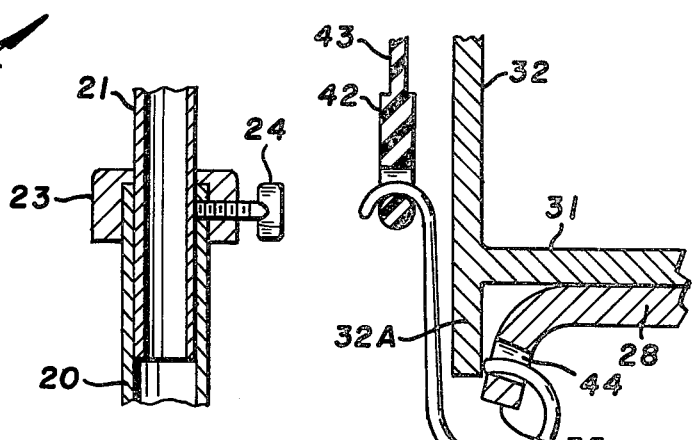
FIG. 3 is an enlarged sectional view of a portion of the pail and work stand of FIG. 1 taken along the line 3—3 thereof.
FIG. 5 is an enlarged fragmentary view of a portion of FIG. 4 showing a fastener hook in engagement with the pail tray.
Figure 4:
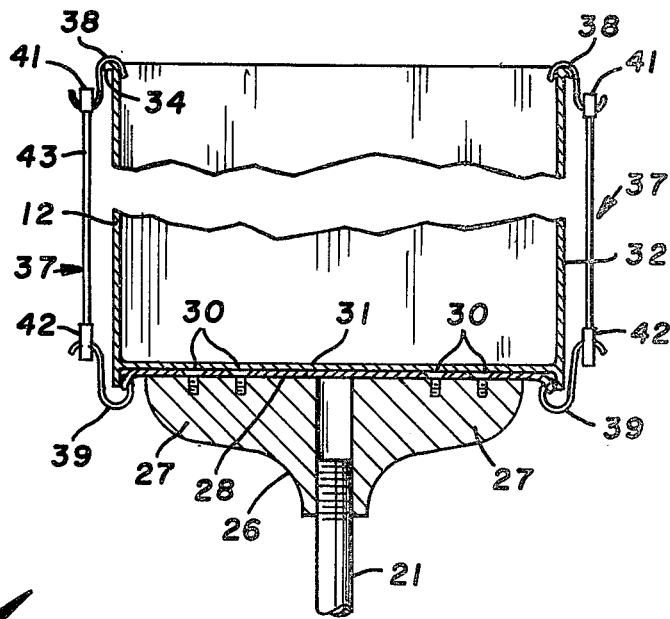
FIG. 4 is an enlarged sectional view of another portion of the pail and work stand assembly of FIG. 1 taken along the line 4—4 thereof.

The diameter of tray 28 is of slightly less than that of pail 12 and the flat bottom or base 31 of pail 12 is supported on the upper surface of tray 28. Pail 12 has a generally cylindrical sidewall 32 extending from proximate bottom 31 to an upper opening defined by the upper annular edge 34 of sidewall 32. As shown in FIG. 5, sidewall 32 has a lower edge 32A extended below the pail bottom 31. Tray 28 is generally circular in conformance with the shape of bottom 31 of pail 12, and has a continuous, downwardly turned annular peripheral lip 35 (see FIG. 5). Lower edge 32A of sidewall 32 straddles lip 35 of tray 28.

A plurality of fasteners 37 releasably connect pail 12 to tray 28 by connecting the upper edge 34 of pail 12 to the annular lip 35 of tray 28. Each fastener 37 includes an upper S-shaped hook 38 and a lower S-shaped hook 39. One open loop of each upper S hook 38 is trained over the upper edge 34 of sidewall 32 of pail 12. The opposite open loop of upper S hook 38 is connected to a first block 41. Tray 28 is provided with a plurality of hook openings 44 shown located on lip 35. As shown in FIG. 5, one open loop of each lower S hook 39 is trained through a hook opening 44 provided in the lip 35 of tray 28. The outer portion of tray 28 adjacent lip 35 can be provided with downwardly bent projections forming a passage or hole for accommodating the lower curved leg of S hook 39. Other types of structures can be used to connect the S hook 39 to tray 28. The opposite open loop of lower S hook 39 is trained through a second block 42. The first and second blocks 41, 42 are connected by an elastic body or cord 43. Each elastic body 43 is of a length relative to the heighth of sidewall 32 such that, with fasteners 37 installed as described, the elastic bodys 43 are in tension sufficient to hold the pail 12 firmly in position on tray 28. Other forms of hook openings could be provided such as loops formed from indentations around the horizontal perimeter of tray 28.

In use of the pail and work stand assembly of the invention, thumbscrew 24 is loosened and upper column member 21 is moved with respect to lower column member 20 to achieve the desired preselected vertical adjustment or height of tray 28 above the ground. When this is accomplished, thumbscrew 24 is tightened to secure the upper column element 21 in position relative to the lower column element 20. Pail 12 is filled with construction material such as plaster, mortar, joint compound or the like and is placed on the tray 28. Pail 12 can also contain water for cleaning. Fasteners 37 are installed about the periphery of pail 12 to hold it in place. The workman then commences his work at the elevated location moving about on elevating means such as stilts. When he wants to move the pail 12, he simply grasps the pail handle 45 with one hand and moves the entire assembly. It is unnecessary for him to dismount from the stilts in order to move the stand and pail thus saving considerable time.

The embodiments of the invention in which an exclusive property or privilege is claimed are defined as follows:

1. A pail and work stand assembly to position a pail for containing building material at a relatively elevated location, comprising:
   a work stand having a supportive base;
   said work stand including column means having an upper end and a lower end, said lower end connected to the base;
   a tray connected to the upper end of the column means to be positioned at a relatively elevated location;
   a pail positioned on the tray and adapted to contain a building material, said pail having a sidewall with an upper edge defining the pail opening and a lower side edge extended downwardly adjacent the outer edge of the tray;
   said tray having a continuous downwardly turned annular peripheral lip;
   fastening means releasably connecting the pail to the tray and including a plurality of fasteners connected between the upper edge of the pail and the tray, each fastener including an upper hook in engagement with the upper edge of the pail, a lower hook in engagement with the downwardly turned lip of the tray, and an elastic member connecting the upper and lower hooks, said elastic member being in tension when securing the pail to the tray.

2. The pail and work stand assembly of claim 1 wherein: a tray support is assembled to the upper end of the column means, said tray being assembled to the tray support.

3. The pail and work stand assembly of claim 1, wherein: said column assembly includes a first column member with a lower end connected to the base and having an open upper end, a second column member having a lower end in telescopic engagement with the upper end of the first column member, said tray being assembled to the upper end of the second column member, and means for securing the position of the second column member with respect to the first column member.

4. The pail and work stand assembly of claim 3 wherein: said base has a threaded opening, said first column member lower end being threaded into the threaded opening of the base.

5. The pail and work stand assembly of claim 4 wherein: said base has four outwardly extended legs, each leg terminating in a downwardly directed foot, and a leveling pad assembled to each foot.

6. A work stand and pail assembly for containing building material at a selected elevated location, comprising:
   base means for supporting the stand on a fixed surface;
   generally upright column means having an upper end and a lower end, said base means and lower end of the column means having cooperating means attaching the column means to the base means;
   a tray mounted on the upper end of the column means, said tray comprised as a generally flat and horizontal plate having an upper surface and a continuous downwardly extended annular peripheral lip;
   a pail having a base supported on the upper surface of the tray and having a diameter larger than the diameter of the tray, said pail having sidewalls with an upper edge defining a pail opening and a lower edge extended downwardly beyond the base of the pail to a position adjacent the lip of the tray; and
   fastening means releasably connected to the tray means adapted to hold the pail on the tray, said fastening means having upper portions cooperable with the upper edge of the pail and lower portions cooperable with the lip of the tray to hold the pail on the tray.

7. The work stand of claim 6 wherein: said lip has a plurality of openings to accommodate portions of the fastening means adapted to releasably connect the pail to the tray.

8. The work stand of claim 6 wherein: said fastening means include a plurality of fasteners adapted to be connected between the upper edge of the pail and the tray, each fastener including an upper hook engageable with the upper edge of the pail and a lower hook connected to the lip of the tray, and an elastic member connected to the upper and lower hook.

9. The work stand of claim 6 wherein: said base means has a plurality of outwardly extended legs, each leg terminating in a downwardly directed foot, and a leveling pad assembled to each foot.

10. The work stand of claim 6 wherein: said column assembly includes a first column member having a lower end connected to the base and having an open upper end, a second column member having a lower end in telescopic engagement with the upper end of the first column member, said tray being mounted on the upper end of second column member, and means for securing the position of the second column member with respect to the first column member.

* * * * *